US006636913B1

(12) United States Patent
Batchelor et al.

(10) Patent No.: US 6,636,913 B1
(45) Date of Patent: Oct. 21, 2003

(54) DATA LENGTH CONTROL OF ACCESS TO A DATA BUS

(75) Inventors: Gary William Batchelor, Tucson, AZ (US); Michael Thomas Benhase, Tucson, AZ (US); Joseph Smith Hyde, II, Tucson, AZ (US); Robert Earl Medlin, Tucson, AZ (US); Juan Antonio Yanes, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/551,861

(22) Filed: Apr. 18, 2000

(51) Int. Cl.[7] .......................... G06F 13/00; G06F 12/00
(52) U.S. Cl. ...................................... 710/107; 710/240
(58) Field of Search ................................ 710/240, 241, 710/242, 243, 244, 107, 108, 109, 110, 111, 112, 113, 114, 115, 116, 117, 118, 119, 120, 121, 122, 123, 125, 124

(56) References Cited

U.S. PATENT DOCUMENTS

| | | | | |
|---|---|---|---|---|
| 5,274,774 A | * | 12/1993 | Manber et al. | 710/125 |
| 5,418,967 A | * | 5/1995 | Simcoe et al. | 710/113 |
| 5,535,341 A | | 7/1996 | Shah et al. | 395/306 |
| 5,579,530 A | | 11/1996 | Solomon et al. | 395/855 |
| 5,600,809 A | | 2/1997 | Masui | 395/378 |
| 5,630,171 A | | 5/1997 | Chejlava, Jr. et al. | 395/843 |
| 5,706,446 A | * | 1/1998 | Kalish et al. | 710/113 |
| 5,748,945 A | | 5/1998 | Ng | 395/500 |
| 6,006,303 A | * | 12/1999 | Barnaby et al. | 710/240 |
| 6,061,764 A | * | 5/2000 | Chittor et al. | 710/107 |
| 6,065,102 A | * | 5/2000 | Peters et al. | 710/107 |
| 6,108,741 A | * | 8/2000 | MacLaren et al. | 710/108 |
| 6,317,803 B1 | * | 11/2001 | Rasmussen et al. | 710/100 |

OTHER PUBLICATIONS

"Coordination of Multiple intelligent bus units by a common controller", IBM Technical Disclosure Bulletin, vol. 34, No. 05, 10/91, pp. 436–439.

"Method for Using A Valid Bill to allow Buffering Interrupt massages", Research Disclosure Bulletin, 04/98, pp. 418–419.

* cited by examiner

Primary Examiner—Tim Vo
(74) Attorney, Agent, or Firm—John H. Holcombe (57) ABSTRACT

A method and system for controlling access to a bus for transferring data in the form of multibyte data streams. Data transfer agents are coupled to and request access to the bus to transfer data thereon. The system for controlling access to the bus comprises a bus arbiter responsive to the access requests of the data transfer agents, granting access to the bus to one data transfer agent at a time. A data length counter accumulates, during the grant of access, signals indicating the length of the data transferred between the bus and the data transfer agent. The data length counter indicates completion of the transfer of a predetermined length of data, and bus arbiter logic responds to the data length counter indicating the transfer completion, causing the bus arbiter to terminate the grant of access to the data transfer agent. The control of access to the bus is thus based on the precise measurement of the length of the transferred data, rather than on timers.

18 Claims, 6 Drawing Sheets

DATA LENGTH CONTROL OF ACCESS TO A DATA BUS

Commonly assigned U.S. patent application Ser. No. 09/275,610 is incorporated for its showing of a PCI bridge system for processing requests from multiple attached hosts.

FIELD OF THE INVENTION

This invention relates to the transfer of both read and write data across a data bus, and, more particularly, to the transfer of data streams in an environment of a plurality of agents attached to the data bus.

BACKGROUND OF THE INVENTION

High capacity bus systems provide the capability of transferring multibyte data streams between host processors and devices attached to the bus system. As one example, the Peripheral Component Interconnect (PCI) bus system is a high-performance expansion bus architecture which offers a low latency path employing PCI bridges through which a host processor may directly access PCI devices. In a multiple host environment, a PCI bus system may include such functions as data buffering and PCI central functions such as arbitration over usage of the bus system.

The incorporated '610 application describes an example of a complex PCI bus system for providing a connection path between a secondary PCI bus, to which are attached a plurality of agents, such as channel adapters, and at least one primary bus to which is attached a peripheral device server. The incorporated '610 application additionally defines many of the terms employed herein, and such definitions are also available from publications provided by the PCI Special Interest Group, and will not be repeated here. Complex PCI bus systems, such as that of the incorporated '610 application, employ arbitration between commands from the attached channel adapters on the bus to manage the usage of the bus system in an efficient manner.

Computer data storage systems may employ high capacity bus systems to provide fast data storage and retrieval between host processors, such as network servers, via channel adapters and the bus system, to attached storage servers having storage devices, cache storage, and/or non-volatile cache storage. It is advantageous to provide data storage and retrieval that operates at relatively fast speeds which approach or match the speeds of the host processors, or that release the host processors, such that the host processors are not slowed. Typically, the host systems coupled to the channel adapters attempt to write and to read large amounts of data at once in the form of multibyte data streams. The bus architecture, such as for a PCI bus system, does not define the total amount of data to be accessed in an operation, and balances the need for high throughput for a given channel adapter with the need for low latency between accesses by agents by requiring that the write and read operations be broken up. To allow a single channel adapter to monopolize the bus to complete the total data transfer in a single transaction would be very inefficient with regard to the bus system as a whole, and would substantially reduce the effective bandwidth of the bus system.

Hence, the bus architecture, e.g., of the PCI bus system of the incorporated '610 application, may attempt to limit single data transfers to major blocks of data made up of small blocks or groups of data, such as 512 bytes. Upon the transfer of a small block of data, the bus arbiter will grant access to the bus to another channel adapter, for example, in a round-robin fashion. The next channel adapter may then transfer a small block of data, etc., and the process will subsequently cycle back to the original channel adapter, which may then transfer another small block of data. Thus, all of the channel adapters having requests to transfer data will be satisfied, reducing the latency of the bus system.

In conducting write operations, channel adapters in a PCI bus system, under PCI protocol, are required to have latency timers which force the channel adapter to give up the bus after a predetermined time. Thus, the channel adapters will have their grants deasserted immediately when beginning the write, and the latency timers will determine when they give up the PCI bus. The channel adapter latency timers are set to not exceed 512 byte transfers so as not to overrun write data buffers, for example, in the PCI bus adapter. However, tuning the latency timers of the channel adapters to move exactly 512 bytes of data each time is difficult if not impossible. As the result, channel adapters that are performing a single write data transfer of 512 bytes or multiple 512 byte transfers have to arbitrate for the PCI bus more than they would normally have to if they were able to transfer 512 bytes each time that they had access to the PCI bus. This behavior degrades the performance of the channel adapter, the PCI bus, and the bus system.

In conducting read operations, the channel adapters may request to read, for example, a large block of 4 K bytes, which is supplied as a number of small block 512 byte reads under the control of the PCI bus manager. The PCI bus system will deassert the grant from the requesting channel adapter while the bus system is prefetching and gathering the requested data, and will issue the grant after the first 512 bytes of the data has been gathered, for example, in a FIFO buffer, as discussed in the incorporated '610 application. Once the first 512 bytes of data is ready to be presented to the channel adapter, the adapter's request will be granted upon the round-robin arbitration, and the transfer of the data begun. The remainder of the requested data will, in the mean time, be prefetched in 512 byte increments. If the channel adapter is faster reading the 512 bytes of gathered data than the PCI bus system is in gathering the next 512 bytes, the PCI bus system will deassert the grant because there is no more available data. The channel adapter will have its "frame" and "initiator ready" signals asserted because it wants 4 K bytes of data. Even though its grant has been deasserted, the channel adapter must wait for the PCI bus adapter to assert a "stop" signal before it can deassert the "frame" and "initiator ready" signals to indicate the last data phase, and thereby release the PCI bus. Specifically, the PCI bus adapter has a PCI retry counter which counts clocks while the adapter looks for "initiator ready" and "target ready" signals to indicate a transfer of data. The counter is intended to hold the bus available so that the PCI bus adapter may have time to transfer the data, forcing a retry if the counter expires. Thus, the "stop" signal will not be asserted until the PCI retry counter has expired. This retry count is set to a predefined time period, such as 1.5 microseconds. The PCI bus is thus in use but not transferring data for the 1.5 microseconds, degrading bus performance.

SUMMARY OF THE INVENTION

It is an object of the present invention to provide a more precise control over access to the bus system, and thereby increase the performance of the bus system.

Disclosed are a method and system for controlling access to a bus for transferring data in the form of multibyte data streams. Data transfer agents are coupled to and request access to the bus to transfer data thereon. The system for controlling access to the bus comprises a bus arbiter coupled to the bus and responsive to the access requests of the data transfer agents, granting access to the bus to one data transfer agent for transferring data. A data length counter accumulates, during the grant of access, signals indicating the length of the data transferred between the bus and the data transfer agent. The data length counter indicates completion of a predetermined length of transferred data, and bus arbiter logic coupled to the data length counter and the bus arbiter, responds to the data length counter indicating the transfer completion, causing the bus arbiter to terminate the grant of access to the data transfer agent.

The data length counter may comprise a data length register storing a value indicating the predetermined length of transferred data, and a comparator comparing the accumulated length of the transferred data to the predetermined length value stored in the data length register. The data length counter, upon the comparator indicating the accumulated length equals the predetermined length value stored in the data length register, provides the indication of the transfer completion.

Thus, the control of access to the bus is based on the length of the transferred data rather than on timers, and is therefore much more precise.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
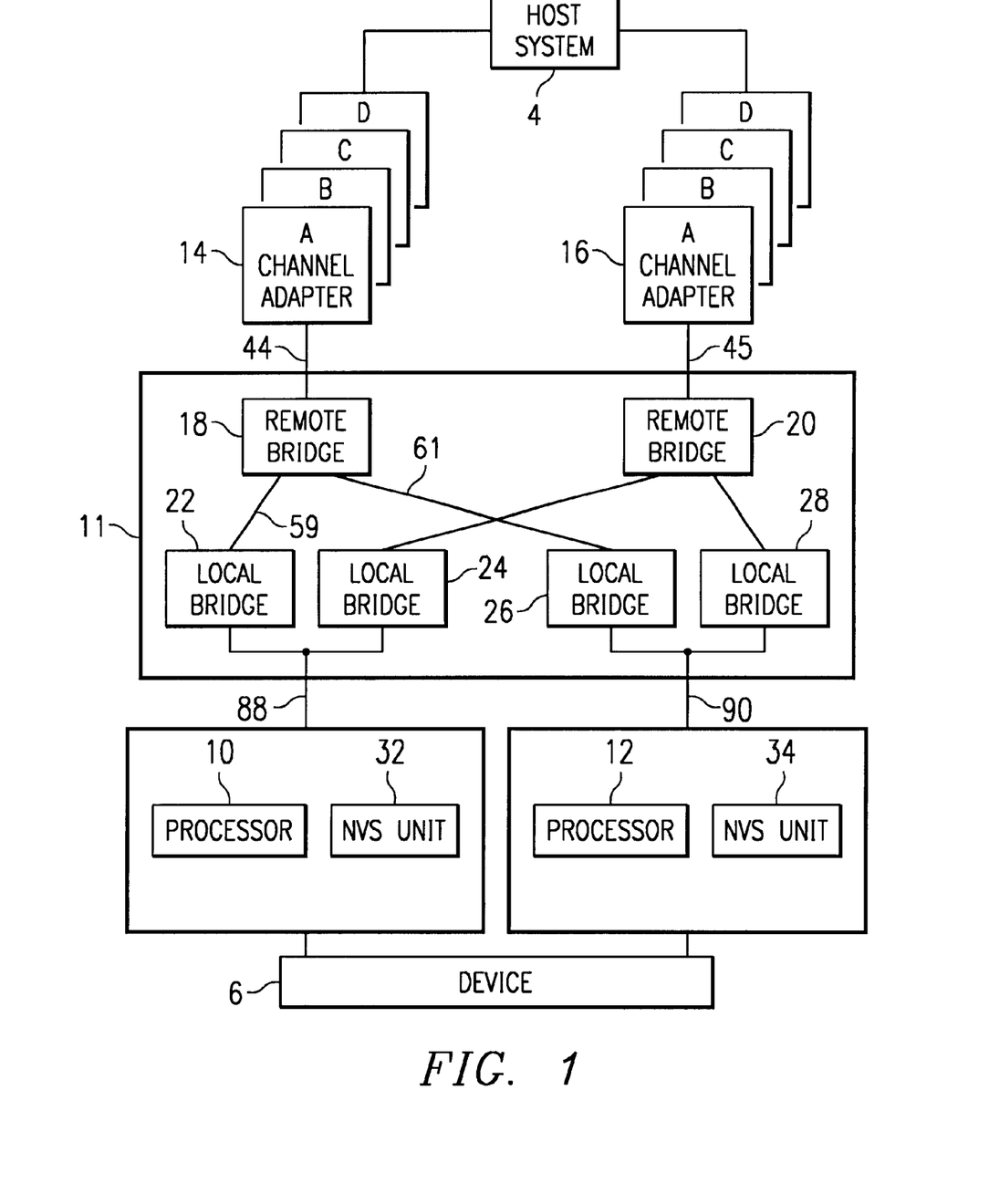
FIG. 1 is a block diagram of a bus system in accordance with an embodiment of the present invention and attached host systems and devices.

Referring to FIG. 1, a bus system 11 is illustrated in accordance with an embodiment of the present invention which provides communication paths, for example, between one or more host systems 4 and devices such as processors 10, 12, a device 6, and NVS (non-volatile store) units 32, 34. The exemplary bus system 11 is based upon the PCI bus system illustrated in the incorporated '610 application, employing similar components, modified in accordance with the present invention. As discussed in the incorporated '610 application, the device 6 may comprise a direct access storage device subsystem, such as a string of DASDs. The present invention is additionally applicable, however, to complex bus systems other than PCI bus systems having a plurality of agents coupled to the bus and requesting data transfer operations.

The bus system 11 allows the host systems 4 to communicate with the processor 10, and processor 12, employing agents, such as channel adapters 14A, B, C and D, 16A, B, C and D, or other communication agents (not shown), including any device that typically communicates over a low latency bus. The channel adapters 14, 16 may comprise channel adapter cards that are each connected via a slot at a secondary bus 44, 45 to a remote bridge 18, 20 of the bus system 11. Each channel adapter card provides a connection to one or more host systems 4 at the secondary bus 44, 45. Briefly, using the example of a PCI bus system, processor 10 controls a primary PCI bus 88, and processor 12 controls a primary PCI bus 90, each providing addresses for access by the adapters 14, 16 at secondary PCI busses 44, 45.

Two remote bridges 18, 20 may be provided, coupled to different sets of channel adapters or other communication agents, and each remote bridge is coupled to local bridges. Thus, remote bridge 18 is coupled to local bridges 22, 26, and remote bridge 20 is coupled to local bridges 24, 28. In the instant example of a PCI bus system, the local bridges 22, 24 may communicate with processor 10 and NVS unit 32 on primary PCI bus 88, and the local bridges 26, 28 may communicate with processor 12 and NVS unit 34 on primary PCI bus 90, although other arrangements may be envisioned by those of skill in the art. Thus, in the present example of a PCI bus system, the adapters 14A–D coupled to remote bridge 18 may communicate with the processors 10, 12 or NVS unit 32, 34 over the PCI bus system 11.

Such bus systems are employed to provide high-performance transfer of data between the host systems 4 and the attached devices. Host systems typically deal with and process large amounts of data and require prompt access to, or storage of, that data to allow the host systems to continue processing without substantial wait times. Therefore, low latency of the bus system is required for such prompt access or storage. This involves balancing high-speed transfer of multibyte data streams in write and read operations, and low latency for each of the operations, such that one host operation does not monopolize the bus system.

In a write operation, a host system 4 may write a data stream at the NVS units 32, 34 and at a device 6, the data stored in the selected unit or device under the control of the processor 10, 12. In FIG. 1, in the example of a PCI bus system, the channel adapters 14, 16 provide PCI write commands and data at the secondary PCI bus 44, 45 to transfer the data to their destinations, and the remote bridge 18, 20 to which the data is transferred across the secondary bus further transfers the data to a local bridge 22, 24, 26, 28, which subsequently transfers the data at the primary bus 88, 90 to the destination. Typically, write data transfers are burst write transfers of large amounts of data. However, the burst write operations typically are for large data streams, so the PCI architecture requires that the write operations be broken up to allow access by other agents on the bus system.

Once stored, the host systems 4 read the data stored at the NVS units 32, 34 and at a device 6, the data stored in the selected unit or device under the control of the processor 10, 12. The data to be stored is typically customer data which is written as a burst of contiguous blocks of data which will be retrieved at a subsequent time. However, the read operations are notoriously slow, so an option under PCI architecture is to remove a grant so a latency timer allows the read operations to be broken up to allow access by other agents on the bus system.

Figure 2:
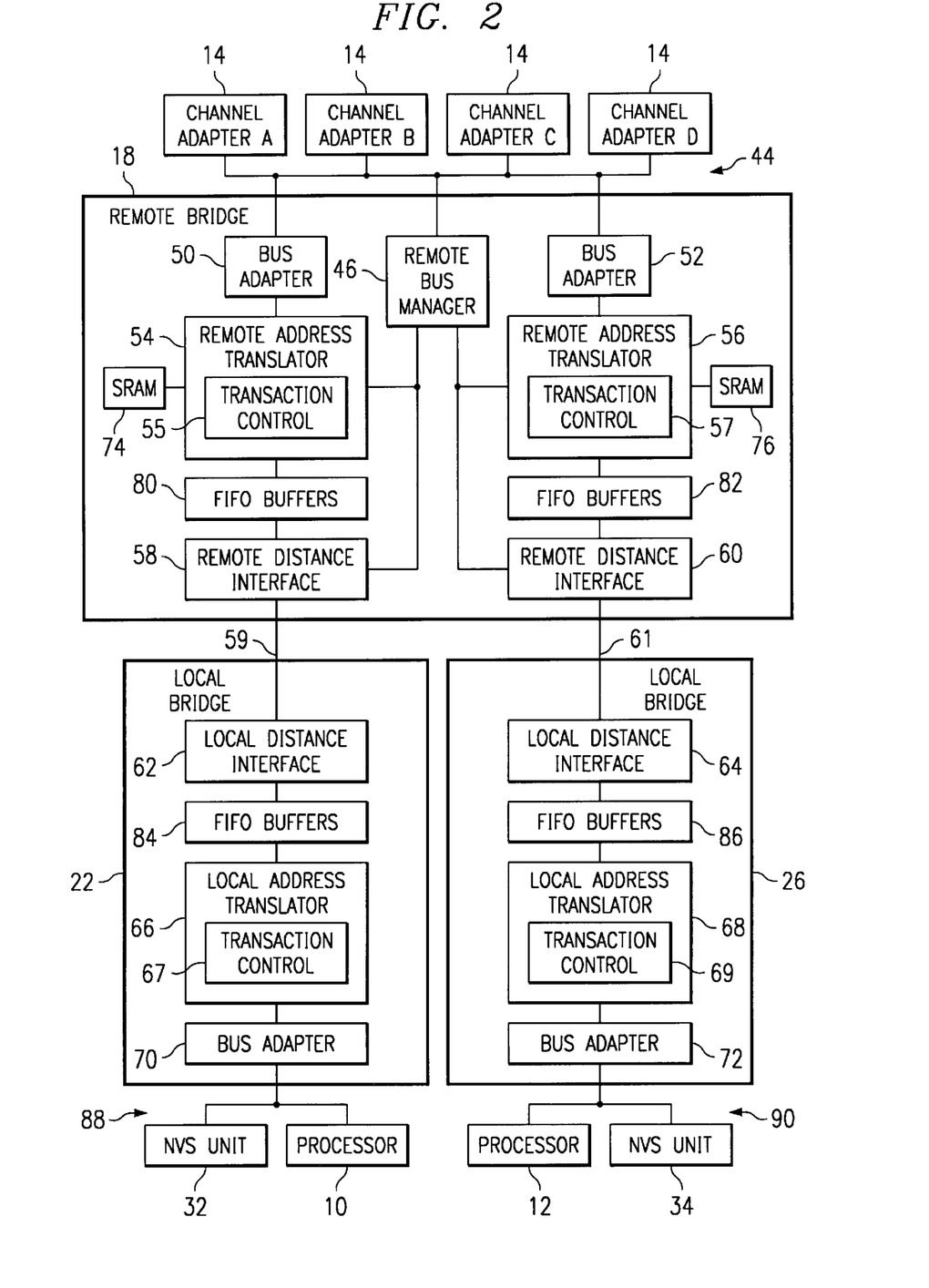
FIG. 2 is a block diagram of the bus system of FIG. 1, illustrating a remote bridge and two local bridges.

Referring additionally to FIG. 2, further detail of one-half of the exemplary complex bus system of FIG. 1 is illustrated, and may comprise a PCI bus system. As discussed in the incorporated '610 application, complex PCI systems employ arbitration between commands from the attached channel adapters on the secondary PCI bus to manage the usage of the bus system in an efficient manner. In the example of FIG. 2, the arbitration is conducted by a bus manager 46. Typically, a bus manager 46 selects the commands from the channel adapters 14A–D on secondary bus 44 in a round-robin fashion. The exemplary PCI bus system of FIG. 2 includes the PCI bus manager 46 which manages data and signals presented on the secondary PCI bus 44.

The bus manager 46 comprises bus central resource functions, which include circuitry that manages the bus arbitration discussed above, bus parking, and other bus management functions, preferably with standalone circuitry, and additionally manages data transfers in accordance with the present invention.

The bus manager 46 has information describing the address ranges of the agents attached to the remote bridge 18, the bus adapters 50 and 52, and other elements of the remote bridge, and uses this information to determine which agent or element is targeted by a bus operation. The information on the address ranges is preferably written to registers in the bus manager 46, and may be copied to the bus adapters 50 and 52. The remote bridge 18 also comprises remote address translators 54, 56, transaction controls 55, 57, remote distance interfaces 58, 60, and static random access memories (SRAM) 74, 76, or any other suitable memory devices. The bus adapter 50, remote address translator 54, transaction control 55, and remote distance interface 58 provide communication between channel adapters 14 and local bridge 22. The bus adapter 52, remote address translator 56, transaction control 57, and remote distance interface 60 provide communication between channel adapters 14 and local bridge 26. The channel adapters 14A, B, C, D communicate with either bus adapter 50 or 52 via the secondary bus 44. The bus adapters 50, 52, remote address translators 54, 56, transaction control 55, 57, remote distance interfaces 58, 60 and SRAMs 74, 76 may comprise logical elements of PCI bridges as are known in the art or any other suitable type of bridge circuitry. The remote 58, 60 and local 62, 64 distance interfaces include controls and buffers known in the art to control transactions between the remote bridge 18 and the local bridges 22, 26 and provide for long distance communication therebetween over long distance connections 59, 61. The remote bridge 20 may be the same or similar to the remote bridge 18, and provides communication with the local bridges 24, 28.

Each local bridge 22, 26 comprises, respectively, a local distance interface 62, 64, a local address translator 66, 68, a transaction control 67, 69, and a bus adapter 70, 72. The remote 54, 56 and local 66, 68 address translators include, circuitry known in the art to map a received address to another address space. Remote address translators 54, 56 perform address translation operations by mapping an address provided by channel adapters 14 to the address space of the local bus adapters 70, 72, respectively. Local address translators 66, 68 map an address from the local bus adapters 70, 72 to the remote bus adapter 50, 52 address space, such that this translated address is transmitted to the remote address translator 54, 56 via the local 62, 64 and remote 58, 60 distance interfaces. In such case, the remote address translator 54, 56 may buffer and transmit this received address to the remote bus adapters 50, 52. Similarly, after remote address translator 54, 56 translates an address received from the remote bus adapter 50, 52 to the address space of the local bus adapter 70, 72, respectively, this translated address is transmitted to the local address translator 66, 68 via the remote 58, 60 and local 62, 64 distance interfaces. In such case, the local address translator 66, 68 may buffer and transmit this received address to the local bus adapter 70, 72.

The FIFO buffer sections 80, 82, 84, and 86 queue the read/write transactions in the bus system 11. Each of the FIFO buffer sections comprises multiple FIFO buffers to queue the transaction from the channel adapters 14A, B, C, D and the processor 10, 12. The address translators 54, 56, 66, and 68 include transaction control circuitry 55, 57, 67, and 69 that includes logic to select queues in the FIFO buffers 80, 82, 84, and 86 to place a transaction and manage the flow of transactions. The FIFO buffers insure that the write commands are kept in sequence as they progress through the bus system 11.

The busses 44, 88 and 90 are designed for only very short distances, measured substantially in inches, and small loads, and the distance connections 59, 61 are designed for longer distances with greater loads.

In balancing the needs for low latency with the need to transfer large amounts of data, bus system architecture breaks up both the write and the read operations, but provides certain safeguards to prevent premature loss of the bus. The difficulty is that the safeguards comprise timers which are difficult to tune to precisely match the actual operation of the bus system. As the result, bus systems may be less than optimally efficient.

Figure 3:
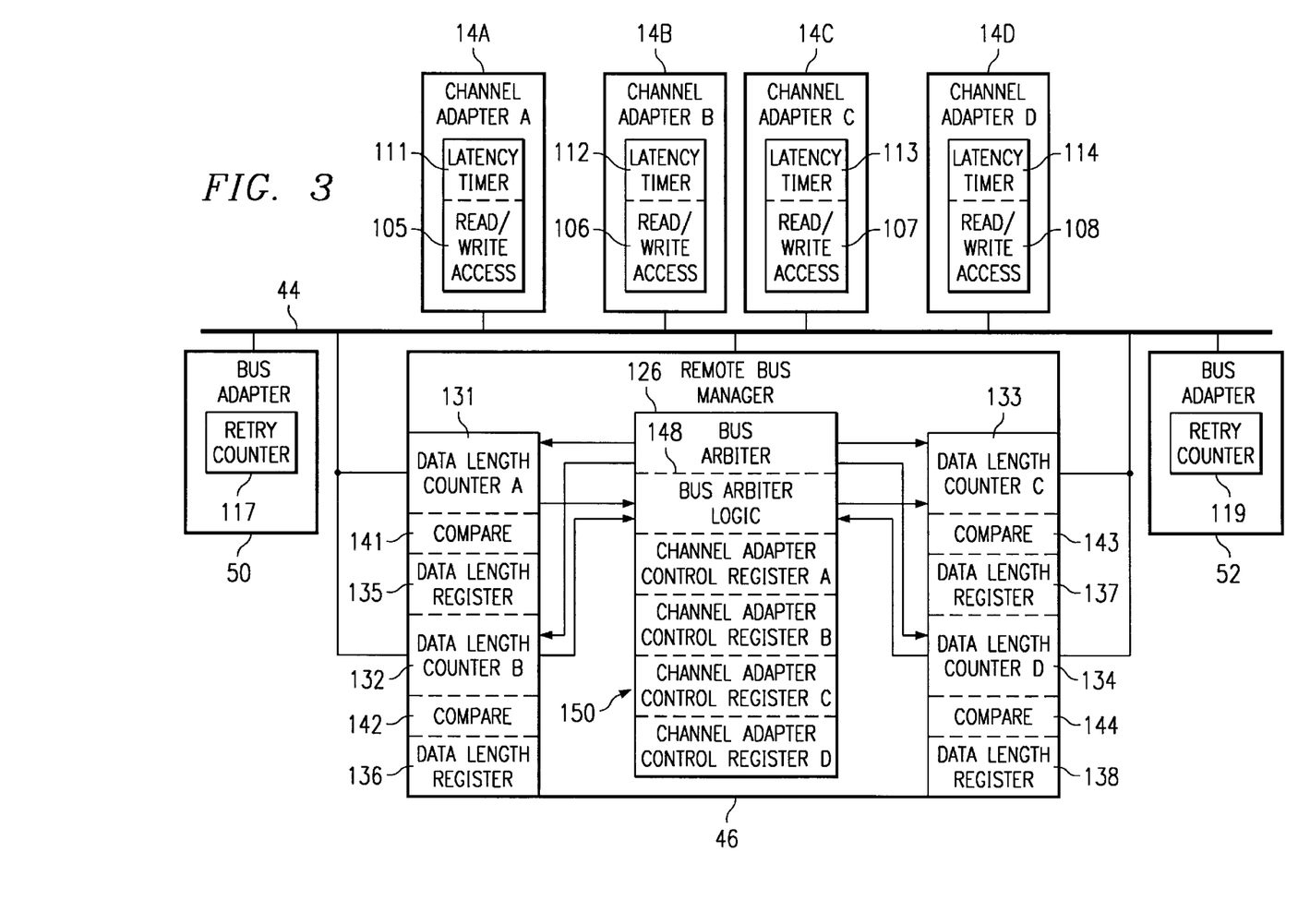
FIG. 3 is a block diagram of the channel adapters, the remote bus manager, and bus adapters of FIG. 2, arranged to implement an embodiment of the present invention.

FIG. 3 illustrates the channel adapters 14A–D, the remote bus manager 46, and bus adapters 50, 52 of FIG. 2, arranged to implement an embodiment of the present invention.

The channel adapters 14A–D are provided with conventional read/write access logic 105–108 and with latency timers 111–114, as is required by the architecture and protocols of the bus system, such as a PCI bus system. The latency timers are intended to provide a safeguard to write operations (and may be used for reads) by insuring that the channel adapter has access to the bus for a predetermined time period, during which a block of data may be transferred to the bus system to be written at the desired device. As an example, a block of data may comprise 512 bytes of data, typically transferred in 128 4-byte words.

The bus adapters 50, 52 are provided with a retry counter 117, 119, which provide a safeguard for read operations to reduce the chance that a channel adapter 14A–D will have access to the bus system ended because there is a gap in the stream of data from the FIFO buffer. Specifically, the retry counter 117, 119 keeps the bus available for the channel adapter 14A–D at the bus adapter 50, 52 for a predetermined period of time, such as 1.5 microseconds, during which time the bus adapter may receive and transfer the data and, if data is available, the read operation will be continued.

A bus arbiter 126 of the remote bus manager 46 provides the conventional arbitration between agents on the secondary bus 44, granting access to the agents, and, sensing the bus, deasserts the grant to break up operations, such as read operations, that appear to have ended or have significant gaps between the transfer of data, discussed above.

In accordance with an embodiment of the present invention, the remote bus manager 46 is also provided with at least one data length counter, and may have one data length counter 131–134 for each channel adapter. The data length counter 131–134 is coupled to the bus 44 and accumulates, during the grant of access, signals indicating the length of the data transferred between the bus and the data transfer agent. As one example, the data length counter 131–134 may count the number of bytes transferred, or as another example, may count the number of multibyte words transferred.

The data length counter 131–134 may comprise a data length register 135–138 storing a value indicating the predetermined length of transferred data, for example, 512 bytes of data, and a comparator 141–144 comparing the accumulated length of the transferred data to the predetermined length value stored in the register. The plurality of data length counters 131–134 and data length registers 135–138 allow a different predetermined length to be established for each channel adapter 14A–D. Alternatively, a single data length counter 131, data length register 135 and comparator 141 may be employed for all of the channel adapters. Still alternatively, the plurality of data length registers 135–138 may be used with a single counter, and the accumulated length of the single counter compared to the predetermined length of the desired register. The data length counter 131–134, upon the comparator indicating the accumulated length equals the predetermined length value stored in the register, provides an indication that the transfer has been completed. As is known to those of skill in the art, a first transfer may be less than 512 bytes to reach a boundary. Thus, the channel adapter may only request small portion of data and will deassert its "initiator ready" and "frame" signals upon completion of the transfer. When the transfer has been completed, the active counter is reset.

Bus arbiter logic 148 is provided, and may comprise a portion of the bus arbiter 126, or separate logic. The bus arbiter logic is coupled to the data length counter 131–134 and the bus arbiter 126, and responds to the data length counter determining from the data length registers that the transfer is complete, and indicating the transfer completion, causing the bus arbiter to terminate the grant of access to the data transfer agent, for example, by deasserting the "grant" signal. Thus, the data transfer is ended precisely at the desired length of data.

Channel adapter control registers 150A–D may be employed to enable the length measurement system of the present invention, for example, by an initiation command from the associated channel adapter, or from another source.

Figure 4:
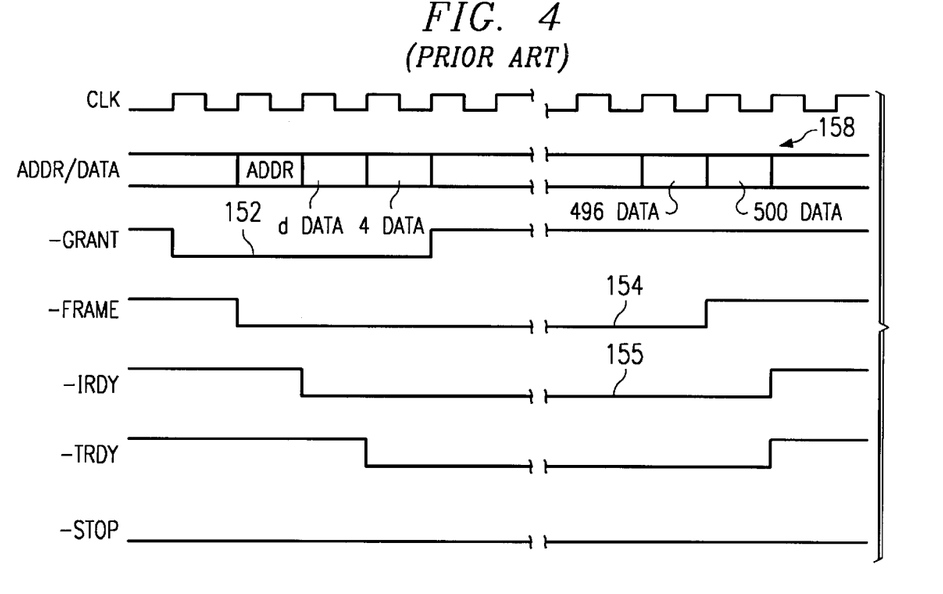
FIG. 4 is a timing diagram of a burst write operation of the prior art employing timing to terminate the write.

FIG. 4 illustrates a timing diagram of a burst write operation of the prior art employing timing to terminate the write. In conducting write operations, channel adapters in a PCI bus system have latency timers which force the channel adapter to give up the bus after a predetermined time. Thus, a channel adapter will have its grant 152 removed immediately when beginning the write, and the latency timers will determine when they give up the PCI bus. The channel adapter latency timers are set to not exceed 512 byte transfers so as not to overrun the PCI bus adapter write data buffers, as discussed above. However, tuning the latency timers of the channel adapters to move exactly 512 bytes of data each time is difficult if not impossible. For example, the latency timer expires, deasserting the channel adapter frame signal 154 and, subsequently, the initiator ready signal 155.

However, the data transfer is rarely done at the fastest speed possible, and the data transfer 158 ends, in the example of FIG. 4, at the word beginning with byte 504. As the result, channel adapters that are performing a single write data transfer of 512 bytes or multiple 512 byte transfers have to go back and arbitrate for the PCI bus more than they would normally have to if they were able to transfer 512 bytes each time that they had access to the PCI bus. This behavior degrades the performance of the channel adapter, the PCI bus, and the bus system.

Figure 5:
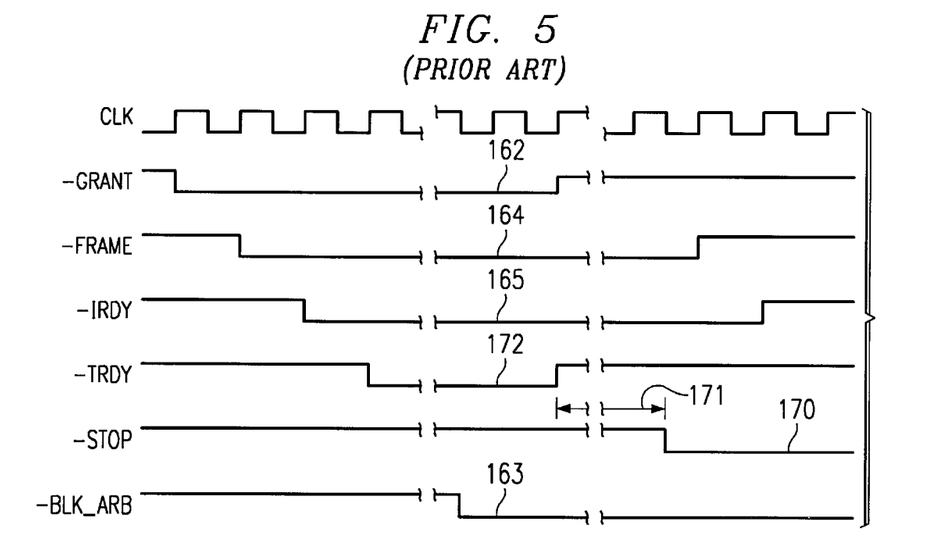
FIG. 5 is a timing diagram of a read operation of the prior art.

FIG. 5 illustrates a timing diagram of a read operation of the prior art. In conducting read operations, the channel adapters may request a read operation of a large block of data, for example, 4 K bytes. The PCI bus manager will suppy the data as a number of small block 512 byte reads. Once the first 512 bytes of data is ready to be presented to the channel adapter, the adapter's request will be granted 162 upon the round-robin arbitration, and the transfer of the data begun. The remainder of the requested data will, in the mean time, be prefetched in 512 byte increments. If the channel adapter is faster reading the 512 bytes of gathered data than the PCI bus system is in the next 512 bytes, the PCI bus system will deassert the grant 162 because there is no more available data. The PCI bus system may block arbitration 163 to hold the bus. The channel adapter have its frame 164 and initiator ready 165 signals asserted because it wants 4 K bytes of data. Thus, even though its grant has been deasserted, the channel adapter must wait for the PCI bus adapter to assert a stop signal 170 before it can deassert the frame 164 and initiator ready 165 signals to indicate the last data phase, and thereby release the PCI bus. Specifically, the PCI bus adapter has a PCI retry counter which is intended to hold the bus available a predetermined time period to allow the PCI bus adapter to transfer the data. After expiration of the time period, the requesting channel adapter will have to retry the read request. Thus, the stop signal 170 will not be asserted until the PCI retry counter has expired. This retry count is set to a predefined time period 171, such as 1.5 microseconds, after the target ready signal 172 is deasserted. The PCI bus is thus in use but not transferring data for the 1.5 microseconds, degrading bus performance.

Figure 6:
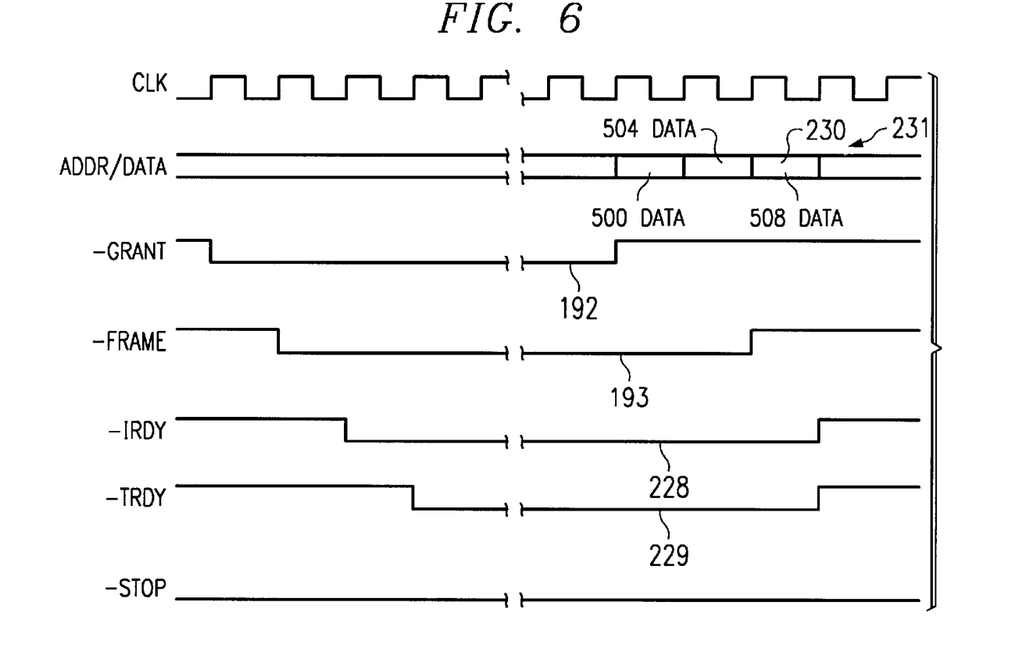
FIG. 6 is a timing diagram of a data transfer operation conducted in accordance with the present invention.

An example of data transfer in accordance with the present invention is illustrated with reference to FIGS. 3, and 6–8. The initialization of the bus system begins at step 190, as illustrated in reference to FIG. 7. In step 191, the latency timers 111–114 of the channel adapters 14A–D, illustrated in FIG. 3, are set to a minimum time, so that the channel adapters will have to terminate access to the bus after the grant has been deasserted. Referring to FIG. 6, with the latency timer initialized to a minimum value, the grant 192 is deasserted by the bus arbiter 126, and the channel adapter deasserts the frame signal 193 after only a programmable time period, such as two clock cycles. As the result, the latency timer no longer controls the timing of access to the bus 44 in a write operation. Rather, control over access to the bus for the channel adapter is changed to the grant of the bus arbiter 126. Some channel adapters may get off the bus in one cycle, or may require two cycles, hence the logic is programmable or adaptive. If one clock cycle is tried and, if incorrect, the logic may be programmed to adapt to two cycles.

Figure 7:
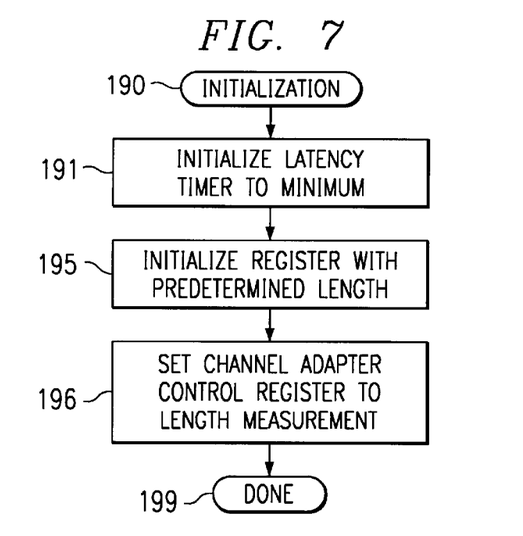
FIG. 7 is a flow chart depicting an embodiment of a method of the present invention for initializing the logic of FIG. 3.

In step 195, the data length registers 135–138 of the data length counters 131–134 are initialized with values to indicate the desired predetermined length, which will result in the transfer of precisely the desired length of data.

In step 196, the channel adapter control register (CACR) 150A–D associated with the channel adapter is set to identify that access to the bus 44 is based on the length of the transferred data. This is accomplished by setting a bit of the channel adapter control register. The bus arbiter 126 responds to the setting of the channel adapter control register 150A–D by continuing the grant in a read operation if the read operation is incomplete, even though there is an absence of data to transfer to the channel adapter. This eliminates the need for the retry timing function of the retry counter 117, 119. The bus arbiter 126 will have an override timer to ultimately deassert the grant if there is a delay in gathering the data to be transferred.

As the result, the retry counter 117, 119 no longer controls the timing of access to the bus 44 in a read operation. Rather, control over access to the bus for the channel adapter is changed to the grant of the bus arbiter 126. At this point, the initialization is complete, as indicated by step 199.

Figure 8:
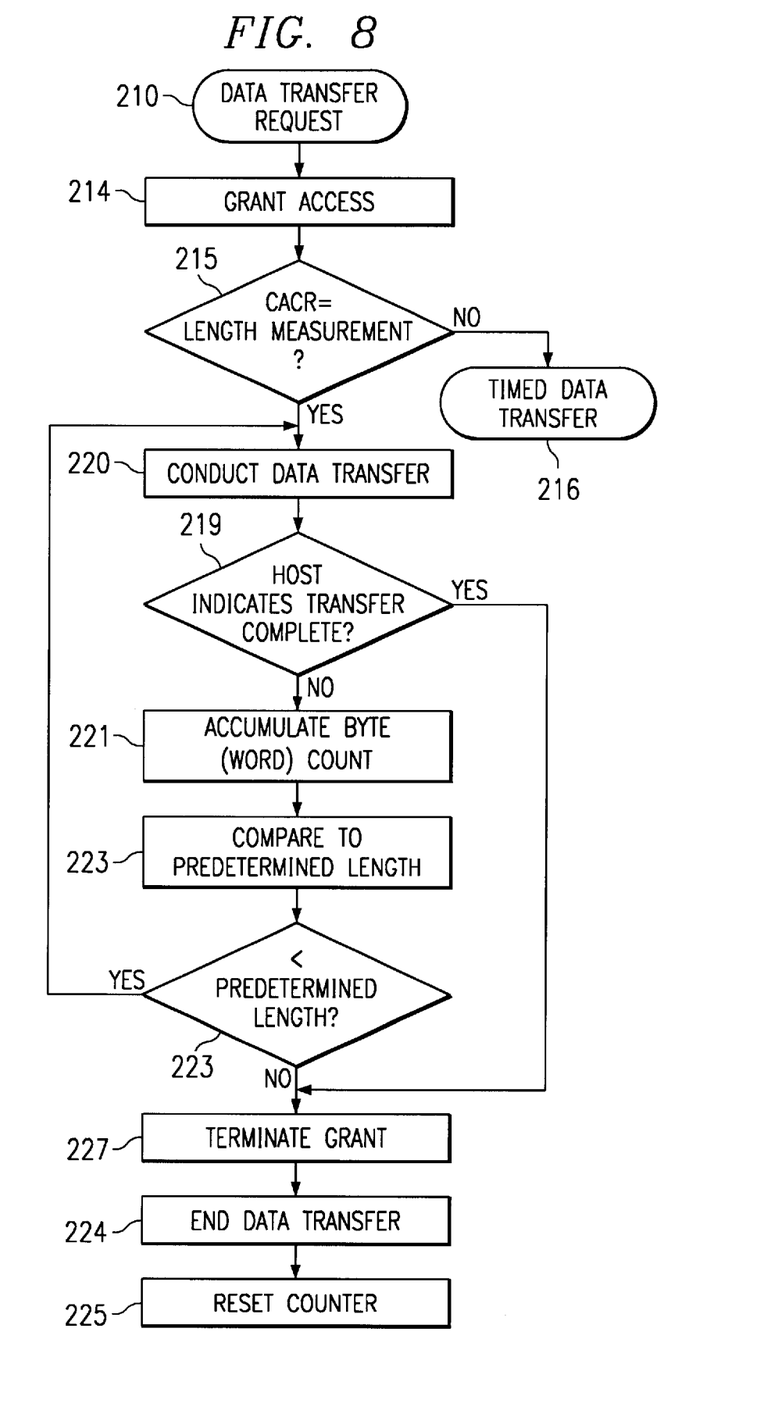
FIG. 8 is a flow chart depicting an embodiment of a data transfer operation conducted in accordance with the present invention.

FIG. 8 illustrates an embodiment of the method of the present invention for the transfer of data, beginning at step 210 with a request by a channel adapter 14A–D of FIG. 3. The remote bus manager 46 responds to the request, and the bus arbiter 126 arbitrates between the various requests for access to the bus, granting access to the requesting channel adapter in step 214.

In step 215, the bus arbiter checks the channel adapter control register 150A–D associated with the requesting channel adapter 14A–D to determine whether the initialization process of FIG. 7 has been conducted with respect to the channel adapter. If not, the data transfer will be conducted by the prior art timing of step 216.

If the initialization has occurred, as indicated by the channel adapter control register, the control over access to the bus will be by means of the precise measurement of the length of the data transferred in accordance with the present invention.

The data transfer begins at step 220, with the conventional signaling on the bus, and data is transferred between the buffer and channel adapter. If, in step 219, the host or channel adapter indicates that the transfer is complete at less than the predetermined length, the bus arbiter removes the grant in step 227, ending the data transfer in step 224, and resetting the counter in step 225. If there is no such indication, the data length counter 131–134 associated with the requesting channel adapter 14A–D, at each single transfer, for example, of a multibyte word, accumulates a signal designating each such transfer in step 221. As each transfer is accumulated, the data length counter 131–134 employs comparator 141–144 to compare, in step 222, the then accumulated length of the transferred data to the predetermined length value stored in the data length register 135–138. The data length counter, in step 223, responds to the comparison, and if the accumulated length is still less than the predetermined length, "YES", indicating that the predetermined length has not been transferred, cycles back for the transfer of the next word.

Upon the comparator 141–144 indicating the accumulated length equals the predetermined length value stored in the data length register 135–138, the data length counter 131–134, in step 223, provides the indication of the transfer completion to the bus arbiter logic 148.

In step 227, the bus arbiter logic 148 operates the bus arbiter 126 to deassert the grant 192 of FIG. 6. With the latency timer 111–114 and the retry counter 117, 119 locked out of the process, the channel adapter 14A–D responds immediately to the deassertion of the grant 192, in step 224, deasserting its frame 193 signal and, subsequently, the initiator ready 228 signal, and the bus adapter 50, 52 responds to the deassertion of the grant 192 and frame 193 by deasserting its target ready signal 229.

As the result, the last word 230 of the data 231 is transferred as the initiator ready 228 and target ready 229 signals are deasserted, thereby precisely controlling the length of the transferred data. There is no opportunity for an overrun of a write data buffer, and the full block of data is transferred so that no extra arbitration for access to the bus 44 is needed by the channel adapter. The counter is then reset in step 225.

Thus, the control of access to the bus is based on the length of the transferred data rather than on timers, and is therefore much more precise.

The specific ordering or content of each of the steps illustrated in FIGS. 7 and 8 may be varied as is known to those of skill in the art, and the specific arrangement or location of each of the logic elements of FIGS. 1–3 may also be varied as is known to those of skill in the art.

While the preferred embodiments of the present invention have been illustrated in detail, it should be apparent that modifications and adaptations to those embodiments may occur to one skilled in the art without departing from the scope of the present invention as set forth in the following claims.

We claim:

1. In a bus system for transferring data in the form of multibyte data streams, said bus system having at least one bus, said at least one bus coupled to a plurality of data transfer agents, said data transfer agents requesting access to said bus to transfer data thereon, a method for controlling access to said at least one bus, comprising the steps of:

initializing a data length count for a bus arbiter, with a length of data to be transferred;

granting access to said bus to one of said plurality of data transfer agents for transferring data thereon;

changing control of deassertion of grant of access based on a frame signal, to said initialized length of data and a frame signal;

accumulating, during said grant of access to said data transfer agent, signals indicating the length of said data transferred between said bus and said data transfer agent, and indicating transfer completion of said initialized length of data; and upon said accumulating step indicating said transfer completion of said initialized length of data, said bus arbiter terminating said grant of access to said data transfer agent.

2. The method of claim 1, wherein said changing control step comprises reducing any latency timing allowing continued access to said bus by said data transfer agents even after said grant of access is terminated, to substantially a minimum latency time, whereby said data transfer agent may release said access request upon said grant termination step.

3. The method of claim 1, wherein said step of initializing a data length count comprises initializing a data length register, which data length register references said one of said data transfer agents, with said initialized length of data, and wherein said accumulating step additionally comprises comparing said accumulated length of said transferred data to said initialized length at said referenced data length register, and, upon said accumulated length equaling said initialized length of said referenced data length register, indicating said transfer completion.

4. The method of claim 2, additionally comprising the step of initializing said data transfer agent to deassert said request for access to said bus upon said termination of said grant of access to said data transfer agent.

5. The method of claim 2, wherein said bus system comprises a PCI bus system having a protocol requiring a PCI latency timer at each of said data transfer agents, said PCI latency timer controlling the timing of allowed access to said bus by said data transfer agents even after said grant of access is terminated, and wherein said method additionally comprises initializing said PCI latency timer to substantially said minimum latency time, whereby said data transfer agent may release said access request upon said grant termination step without waiting for said PCI latency timer.

6. The method of claim 5, wherein said PCI bus system maintains an availability of said PCI bus to said request of access of said data transfer agent after a said grant has been terminated, and wherein said method comprises the step of initializing said data transfer agent to deassert said request for access to said bus upon said termination of said grant of access to said data transfer agent.

7. In a bus system for transferring data in the form of multibyte data streams, said bus system having at least one bus, said at least one bus coupled to a plurality of data transfer agents, said data transfer agents requesting access to said bus to transfer data thereon, a system for controlling access to said at least one bus, comprising:
 a bus arbiter coupled to said at least one bus, responsive to said access requests of said plurality of data transfer agents, granting access to said bus to one of said plurality of data transfer agents for transferring data thereon;
 a data length counter, accumulating, during said grant of access of said bus arbiter, signals indicating the length of said data transferred between said bus and said data transfer agent, and indicating transfer completion of an initialized length of data; and
 bus arbiter logic coupled to said data length counter and said bus arbiter, initializing said data length counter with a length of data to be transferred; changing control of deassertion of said grant of access based on a frame signal, to said initialized length of data and a frame signal; responsive to said data length counter indicating said transfer completion of said initialized length of data, causing said bus arbiter to terminate said grant of access to said data transfer agent.

8. The system of claim 7, wherein said data length counter additionally comprises a data length register, said data length register storing said initialized length of data, and a comparator comparing said accumulated length of said transferred data to said data length register stored initialized length, and wherein said data length counter, upon said comparator indicating said accumulated length equals said data length register stored initialized length, indicates said transfer completion.

9. The system of claim 8, wherein said data length counter comprises a plurality of said data length registers, each of said data length registers referencing a separate one of said data transfer agents, such that each of said data length registers may store a different said initialized length of data with respect to said referenced data transfer agent.

10. The system of claim 9, wherein said bus system comprises a PCI bus system having PCI bus protocols; wherein said bus arbiter grants said access to said data transfer agents on a mutually exclusive basis, providing a grant signal on said at least one bus relating to one of said data transfer agents in accordance with said PCI bus protocols; and wherein said system additionally comprises a channel adapter control register associated with each said data transfer agent that may be programmed to a mode in which it responds to said data length counter indicating said transfer completion of an initialized length of data, operating said bus arbiter to terminate said grant of access to said data transfer agent in accordance with said PCI bus protocols.

11. A bus system for controlling the transfer of data in the form of multibyte data streams, comprising:
 at least one bus;
 a plurality of data transfer agents coupled to said at least one bus, said data transfer agents requesting access to said bus to transfer data thereon;
 a bus arbiter coupled to said at least one bus, responsive to said access requests of said plurality of data transfer agents, granting access to said bus to one of said plurality of data transfer agents for transferring data thereon;
 a data length counter, accumulating, during said grant of access of said bus arbiter, signals indicating the length of said data transferred between said bus and said data transfer agent, and indicating transfer completion of an initialized length of data; and
 bus arbiter logic coupled to said data length counter and said bus arbiter, initializing said data length counter with a length of data to be transferred; changing control of deassertion of said grant of access based on a frame signal, to said initialized length of data and a frame signal; responsive to said data length counter indicating said transfer completion of said initialized length of data, causing said bus arbiter to terminate said grant of access to said data transfer agent.

12. The bus system of claim 11, wherein said data length counter additionally comprises a data length register, said data length register storing said initialized length of data, and a comparator comparing said accumulated length of said transferred data to said data length register stored initialized length, and wherein said data length counter, upon said comparator indicating said accumulated length equals said data length register stored initialized length, indicates said transfer completion.

13. The bus system of claim 11, wherein said bus transfer agents additionally are adapted to reduce any latency timing allowing continued access to said bus by said data transfer agents even after said grant of access is terminated, to substantially a minimum latency time, whereby said data transfer agent may release said access request upon said grant termination.

14. The bus system of claim 11, wherein said data transfer agents are initialized to deassert said request for access to said bus upon said termination of said grant of access to said data transfer agent.

15. The bus system of claim 12, wherein said data length counter comprises a plurality of said data length registers, each of said data length registers referencing a separate one of said data transfer agents, such that each of said data length registers may store a different said initialized length of data with respect to said referenced data transfer agent.

16. The bus system of claim 14, wherein said bus system comprises a PCI bus system having a protocol, and wherein each of said data transfer agents comprises a PCI latency timer required by said PCI bus protocol, said PCI latency timer allowing continued access to said bus by said data transfer agent for a latency time period even after said grant of access is terminated, and wherein said PCI latency timer is initialized to substantially said minimum latency time period, whereby said data transfer agent may release said access request upon said grant termination by said bus arbiter without waiting for said PCI latency timer.

17. The bus system of claim 15, wherein said bus system comprises a PCI bus system having PCI bus protocols; wherein said bus arbiter grants said access to said data transfer agents on a mutually exclusive basis, providing a grant signal on said at least one bus relating to one of said data transfer agents in accordance with said PCI bus protocols; and wherein said bus system additionally comprises a channel adapter control register associated with each said data transfer agent that may be programmed to a mode in which it responds to said data length counter indicating said transfer completion of an initialized length of data, operating said bus arbiter to terminate said grant of access to said data transfer agent in accordance with said PCI bus protocols.

18. The PCI bus system of claim 16, additionally comprising a retry counter, said retry counter maintaining availability of said PCI bus to said request of access of said data transfer agent after a grant has been terminated, and wherein said data transfer agent is initialized to deassert said request for access to said bus upon said termination of said grant of access to said data transfer agent, whereby said PCI retry counter remains unenabled.

\* \* \* \* \*